United States Patent Office 3,553,558
Patented Jan. 5, 1971

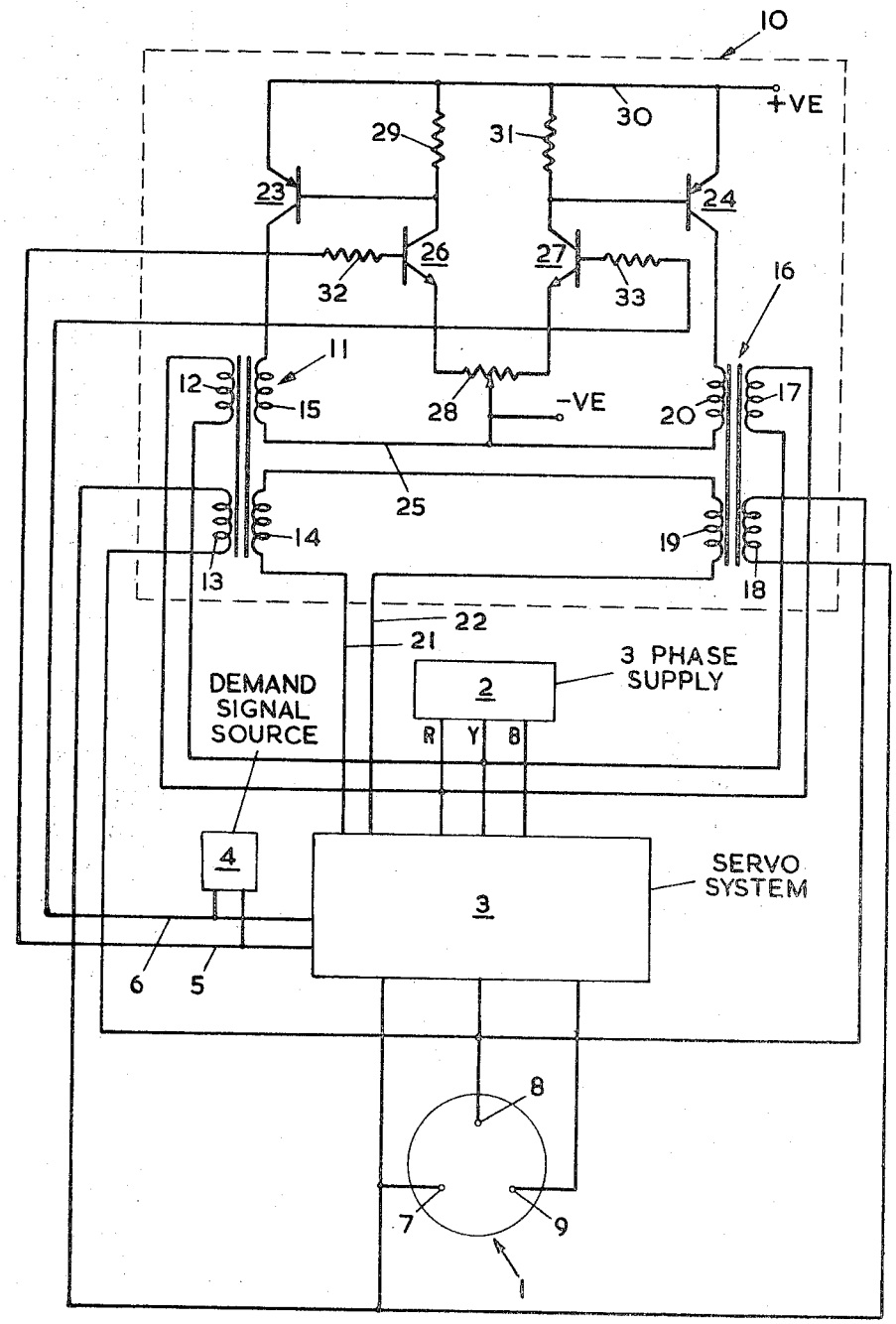

3,553,558
MONITORING CIRCUITS
Brian Killoran, Bradford, England, assignor to The English Electric Company Limited, London, England, a British company
Filed Nov. 29, 1968, Ser. No. 779,848
Claims priority, application Great Britain, Dec. 1, 1967, 54,779/67
Int. Cl. G05f 7/00
U.S. Cl. 318—565   8 Claims

ABSTRACT OF THE DISCLOSURE

This invention relates to a monitoring circuit which produces a fault indicating signal if the phase sequence of supply lines to a three-phase motor is not as required by a demand signal. Two reference phases (R and Y) are fed to a winding on each of two transformers. Two motor phases, which should be either R and Y, respectively, or Y and R, respectively, or zero (depending upon the demand signal) are connected to another winding on each transformer such that fluxes due to the reference and motor phases cancel in one transformer but add in the other to induce a fault indicating signal in a third winding. If the motor phase sequence is correct, the demand signal causes saturation of the transformer to inhibit the induced signal. If the motor supply is correctly zero, signals are induced in both transformers and cancel, but if it is zero due to a fault, one of the induced signals is inhibited whilst the other remains to indicate the fault.

---

This invention relates to monitoring circuits and particularly to circuits for monitoring the operation of apparatus for controlling electric motors.

According to the invention, a monitoring circuit for monitoring an input signal which is required to have a specified first or second phasing relative to a reference signal includes first and second circuit means responsive to input signals of said first and second phasing, respectively, to produce an output signal, and means to inhibit production of the output signal at any instant if the input signal has the phasing which is specified at that instant.

Each circuit means may include a transformer having first and second windings arranged for energisation of said reference and input signals, respectively, and a third winding for production of said output signal. Magnetic fluxes generated by said reference and input signals may be additive in one of said transformers and subtractive in the other transformer.

Each transformer may also have a fourth winding which is energisable to saturate the core of the transformer.

One embodiment of the invention will now be described, by way of example, with reference to the accompanying drawing, which is a diagram of a circuit arranged to monitor the operation of a motor control servo system.

Referring now to the drawing, an electric motor 1 is connected to a three-phase supply 2 by a servo system 3. A demand signal source 4, associated with the servo system 3, applies a control signal to a line 5 if clockwise rotation of the motor 1 is required, or to a line 6 if anticlockwise rotation is required. If the motor 1 is to be stationary, neither of the lines 5 or 6 is energised.

Terminals 7, 8 and 9 of the motor 1 are connected by the servo system 3 to red, yellow and blue phases, respectively, of the supply 2 if clockwise rotation of the motor 1 is required, and to the yellow, red and blue phases, respectively, if anticlockwise rotation is required.

A monitoring circuit 10 is arranged to monitor the operation of the servo system 3 to ensure that the motor terminals 7 and 8 are connected to the correct phases of the supply 2 for the required rotation as specified by the demand signal on line 5 or on line 6. The circuit 10 also ensures that if the motor is required to be stationary, no supply is applied to the terminals 7 and 8. If any fault occurs in the operation of the servo system 3 resulting in the incorrect application of a supply to terminals 7 and 8, the circuit 10 generates a fault indicating signal which causes switchgear in the servo system 3 to switch off the supply to the motor 1.

The monitoring circuit 10 includes a transformer 11 having windings 12 to 15, and an identical transformer 16 having windings 17 to 20. The start and finish of the winding 12 and the start and finish of the winding 17 are connected to the red and yellow phases, respectively, of the supply 2. The start of the winding 13 and the finish of the winding 18 are connected to the terminal 7 of the motor 1, and the finish of the winding 13 and the start of the winding 18 are connected to the terminal 8. Hence, if the terminals 7 and 8 are connected by the servo system 3 to the red and yelow phases, respectively, magnetic fluxes in the transformer 11 due to the windings 12 and 13 will be additive, and magnetic fluxes in the transformer 16 due to the windings 17 and 18 will be subtractive. Conversely, if the terminals 7 and 8 are connected to the yellow and red phases, respectively, the fluxes in the transformer 11 will be subtractive and the fluxes in the transformer 16 will be additive.

The start of the winding 14 is connected to the start of the winding 19, and the finish of the winding 14 and the finish of the winding 19 are connected by lines 21 and 22, respectively, to the servo system 3. The start of the winding 15 and the start of the winding 20 are connected, respectively, to the collector electrodes of pnp transistors 23 and 24. The finish of each of the windings 15 and 20 is connected to a negative supply line 25. Two npn transistors 26 and 27 have their emitter electrodes connected to opposite ends of a balancing resistor 28 which has a movable tapping connected to the line 25.

The collector electrode of transistor 26 is connected to the base electrode of transistor 23 and is also connected via a load resistor 29 to a positive supply line 30. The collector electrode of the transistor 27 is connected to the base electrode of the transistor 24 and is also connected via a load resistor 31 to the line 30. The base electrodes of the transistors 26 and 27 are connected by resistors 32 and 33, respectively, to the lines 5 and 6. The transistors 23, 24, 26 and 27 together form a differential amplifier. The demand signal applied to the line 5 or to the line 6 by the source 4 is sufficient to switch the respective transistor 26 or 27 from a non-conductive to a conductive state, and hence to cause the transistor 23 or the transistor 24, respectively, to conduct, thereby passing a current through the winding 15 or the winding 20, respectively, to saturate the core of the transformer 11 or the core of the transformer 16, respectively.

In describing the operation of the circuit 10 it is necessary to consider all the possible correct and incorrect combinations of the demand signal on lines 5 and 6 and the phasing of the supply to the motor terminals 7 and 8. These combinations and the corresponding modes of operation of the circuit 10 are set out under headings (a) to (i) below.

(a) Clockwise rotation is demanded by a signal on line 5, and the terminals 7 and 8 are correctly connected to the red and yellow phases, respectively.

The transformer 16 produces no (or negligible) output in the winding 19 because the fluxes due to windings 17 and 18 are in opposition and substantially cancel. The transformer 11, on the other hand, would produce an output in winding 14 because the fluxes in windings 12 and 13 are additive. However, the signal on line 5 causes the transistor 26, and hence the transistor 23, to conduct and a current sufficient to saturate the core of transformer 11 flows through the winding 15. Saturation of the core inhibits generation of an output in the winding 14, so no indicating signal passes over the lines 21 and 22 to the servo system 3 and the system continues to function correctly.

(b) Anti-clockwise rotation is demanded by a signal on line 6, and motor terminals 7 and 8 are correctly connected to the yellow and red phases, respectively.

Transformer 11 produces no output because the fluxes due to windings 12 and 13 are now in opposition and cancel. An output would be induced in winding 19 because the fluxes due to windings 17 and 18 are now additive. However, the core of transformer 16 is saturated by current through winding 20 because the line 6 is energised and causes conduction of the transistor 27 and hence of the transistor 24. Saturation of the core inhibits generation of an output in the winding 19, so no signal is fed over the lines 21 and 22 and the servo system 3 continues to function correctly.

(c) Zero rotation is demanded by de-energisation of both lines 5 and 6, and zero voltage appears between terminals 7 and 8.

Since both line 5 and line 6 are de-energised, transistors 23 and 24 are both cut off and no current flows through windings 15 and 20. No current flows through windings 13 and 18 because zero voltage appears at terminals 7 and 8. Only windings 12 and 17 are energised, and an output signal is therefore induced in both winding 14 and winding 19. However, the windings 14 and 19 are connected in opposition, so no signal is applied to the lines 21 and 22.

(d) Clockwise rotation is demanded by a signal on line 5, but the terminals 7 and 8 are connected to the yellow and red phases, respectively, to cause anti-clockwise rotation.

Transistors 23 and 26 are switched on by the signal on the line 5 and the core of transformer 11 is saturated by current through winding 15. Furthermore, the fluxes due to windings 12 and 13 are now in opposition. No output signal is, therefore, induced in winding 14. The fluxes due to windings 17 and 18 are now additive. No saturation current flows through winding 20 because transistor 24 remains cutoff. Hence a signal is induced in winding 19, and since this is not opposed by a signal in winding 14, an indicating signal is fed over the lines 21 and 22 to cause the motor supply to be switched off.

(e) Anti-clockwise rotation is demanded by a signal on line 6, but the terminals 7 and 8 are connected to the red and yellow phases, respectively, to cause clockwise rotation.

The fluxes due to windings 17 and 18 are in opposition and the core of transformer 16 is saturated because the transistors 24 and 27 are made conductive by the signal on line 6. Hence no output is induced in winding 19. The fluxes due to windings 12 and 13 are additive, and, since transistor 23 remains shut off, the core of transformer 11 is not saturated. Hence an output is induced in winding 14 and an indicating signal is passed over the lines 21 and 22 to cause the motor supply to be switched off.

(f) Clockwise rotation is demanded by a signal on line 5, but zero voltage appears between terminals 7 and 8.

Neither winding 13 nor winding 18 is energised because no voltage exists between terminals 7 and 8. Transistor 23 is switched on by the signal on line 5 and current through winding 15 saturates the core of transformer 11. Therefore no output signal is induced in winding 14. Transformer 16 is, however, not saturated and flux due to winding 17 causes a signal to be induced in winding 19 and to be fed over lines 21 and 22 to cause the motor supply to be switched off.

(g) Anti-clockwise rotation is demanded by a signal on line 6, but zero voltage appears between terminals 7 and 8.

Neither winding 13 nor winding 18 is energised because no voltage exists between terminals 7 and 8. The core of transformer 16 is saturated by current through winding 20 and therefore no signal is induced in winding 19 by flux due to winding 17. Transformer 11 is not saturated and the flux due to winding 12 induces a signal in winding 14 which is fed over lines 21 and 22 to cause the motor supply to be switched off.

(h) Zero rotation is demanded by de-energisation of both lines 5 and 6, but the terminals 7 and 8 are connected to the red and yellow phases, respectively, to cause clockwise rotation.

Since both lines 5 and 6 are de-energised neither transistor 23 nor transistor 24 conducts. Hence neither transformer 11 nor transformer 16 is saturated. The fluxes due to windings 17 and 18 are in opposition, so no signal is induced in winding 19. The fluxes due to windings 12 and 13 are additive and induce a signal in winding 14 which is fed over lines 21 and 22 to cause the motor supply to be switched off.

(i) Zero rotation is demanded by de-energisation of both lines 5 and 6, but the terminals 7 and 8 are connected to the yellow and red phases, respectively, to cause anti-clockwise rotation.

As in (h) above neither of the transistors 23 and 24 is conducting. Hence neither transformer 11 nor transformer 16 is saturated. The fluxes due to windings 12 and 13 are in opposition, so no signal is induced in winding 14. The fluxes due to windings 17 and 18 are additive and induce a signal in winding 19 which is passed over lines 21 and 22 to cause the motor supply to be switched off.

Although in the above embodiment the cores of the transformers 11 and 16 are selectively saturated by current from a differential amplifier including transistors 23, 24, 26 and 27 to inhibit production of the indicating signal, other inhibiting means may be provided, such as a thermionic valve circuit for causing saturation of the cores. Alternatively a transistor or other switching device might be used to inhibit production of the indicating signal without saturation of the transformer cores.

The monitoring circuit 10 may be used for monitoring apparatus other than a 3-phase motor servo system. For example it could be used for monitoring apparatus in which a single phase supply is reversible to produce either of two mutually out of phase output signals. Furthermore, the indicating signal need not be used for switching off a power supply, it may, for example, merely operate an alarm or other indicating arrangement.

I claim:

1. A monitoring circuit for monitoring an input signal which is required to have a specified first or second phasing relative to a reference signal, said monitoring circuit including first and second circuit means responsive to input signals of said first and second phasing, respectively, to produce an output signal, first and second transformers respectively connected within said first and second circuit means, a pair of first windings arranged for energisation by said reference signal, a pair of second windings arranged for energisation by said input signal, a pair of third windings arranged for production of said output signal wherein the windings of each pair of windings are associated respectively with said first and second transformers, and means to inhibit production of the output signal at any instant if the input signal has the phasing which is specified at that instant, said first pair of windings and said second pair of windings being arranged so that the magnetic fluxes generated in said first and second transformers by said reference and input signals are additive in one of said transformers and subtractive in the other transformer.

2. A monitoring circuit as claimed in claim 1 in which there is further provided a pair of fourth windings, one of said pair of fourth windings being associated with said first transformer and the other of said pair of fourth windings being associated with said second transformer, wherein said pair of fourth windings form a part of said means to inhibit production of the output signal and are selectively energisable to saturate the core of the respective transformer.

3. A monitoring circuit as claimed in claim 2 including a switching circuit and means to provide a demand signal wherein said switching circuit is operable to energise said pair of fourth windings selectively in response to the demand signal which specifies the required phasing of the input signal.

4. A monitoring circuit as claimed in claim 3, in which said switching circuit includes a differential amplifier.

5. A monitoring circuit as claimed in claim 1 in which said third windings of the first and second transformers are connected in series to produce a common indicating signal.

6. A monitoring circuit as claimed in claim 1 in which said input signal may alternatively be required to have zero amplitude, and in which each of said circuit means is arranged to produce an output signal if said input signal is of zero amplitude, said output signals being arranged to cancel each other substantially if the input signal is required to have zero amplitude.

7. A monitoring circuit as claimed in claim 6 in which the inhibiting means is arranged to inhibit the production of one of the output signals if the input signal is of zero amplitude but is required to have said first or second phasing, thereby causing generation of an indicating signal.

8. A monitoring circuit as claimed in claim 3 arranged to monitor a signal applied to an input circuit of an electric motor.

References Cited

UNITED STATES PATENTS

| | | | |
|---|---|---|---|
| 2,628,999 | 2/1953 | Bruyne | 317—43X |
| 3,109,129 | 10/1963 | Putzer et al. | 318—29 |
| 3,113,247 | 12/1963 | Byloff | 317—48 |
| 3,396,310 | 8/1968 | Logan | 307—127X |

BENJAMIN DOBECK, Primary Examiner

U.S. Cl. X.R.

307—127